Oct. 13, 1953  Z. P. CANDEE  2,655,013
FLEXIBLE POWER TRANSMISSION COUPLING
Original Filed June 26, 1947  2 Sheets-Sheet 1

INVENTOR
ZENAS P. CANDEE
BY
H. G. Manning
ATTORNEY

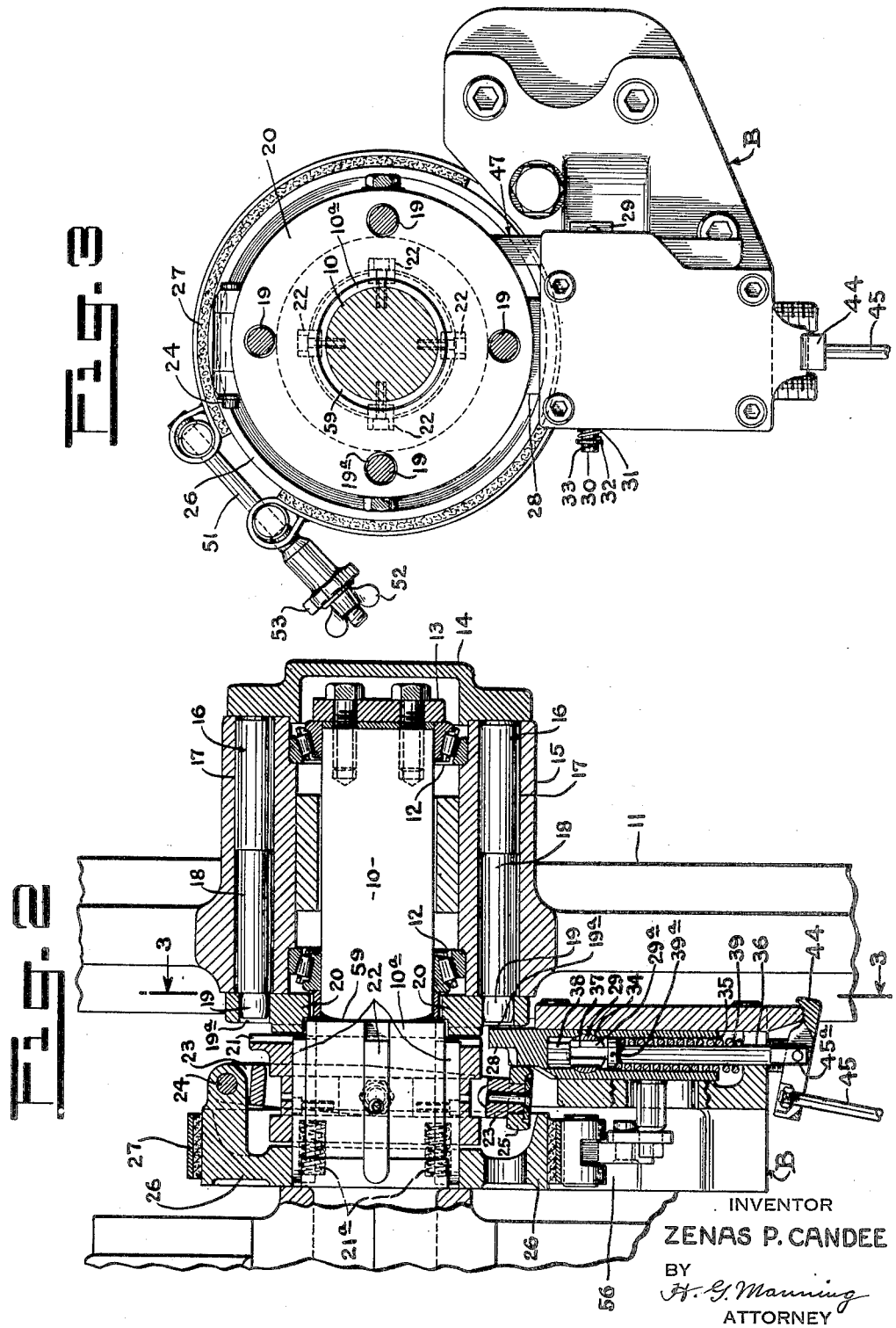

Patented Oct. 13, 1953

2,655,013

UNITED STATES PATENT OFFICE 2,655,013

FLEXIBLE POWER TRANSMISSION COUPLING

Zenas P. Candee, Watertown, Conn., assignor to The Waterbury Farrel Foundry & Machine Company, Inc., Waterbury, Conn., a corporation of Connecticut Original application June 26, 1947, Serial No. 757,227. Divided and this application December 6, 1950, Serial No. 199,472

1 Claim. (Cl. 64—15)

This invention relates to clutches, and more particularly to a positively-operated jaw clutch for quickly starting a power press.

One object of the present invention is to provide a positive clutch of the above nature having a "floating" driving jaw of limited flexibility to absorb the shock of starting the driven jaw and which will be self-aligning to compensate for minor inaccuracies in the machining of said jaws.

A further object is to provide a power press clutch of the above nature in which a floating jaw plate is secured to a plurality of self-centering spring plugs located within the hub of a driving member such as a fly wheel so that said driving plate will be resiliently restricted to permit a limited lateral or axial motion with respect to said driving member.

A further object is to provide a machine of the above nature, which will be relatively simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

The present application constitutes a division of my prior copending application, Serial Number 757,227 entitled "Positive Jaw Clutch for Power Presses", filed June 26, 1947, patented July 10, 1951, No. 2,559,709.

In the drawings,

Fig. 2 is a fragmentary longitudinal sectional view, on a larger scale, of a portion of the fly wheel, clutch, and brake mechanisms, taken along the axis of the fly wheel shaft—with the press shown in "stopped" position.

Fig. 3 is a cross-sectional view of the same, taken along the line 3—3 of Fig. 2, looking in the direction of the arrows.

Figure 1:
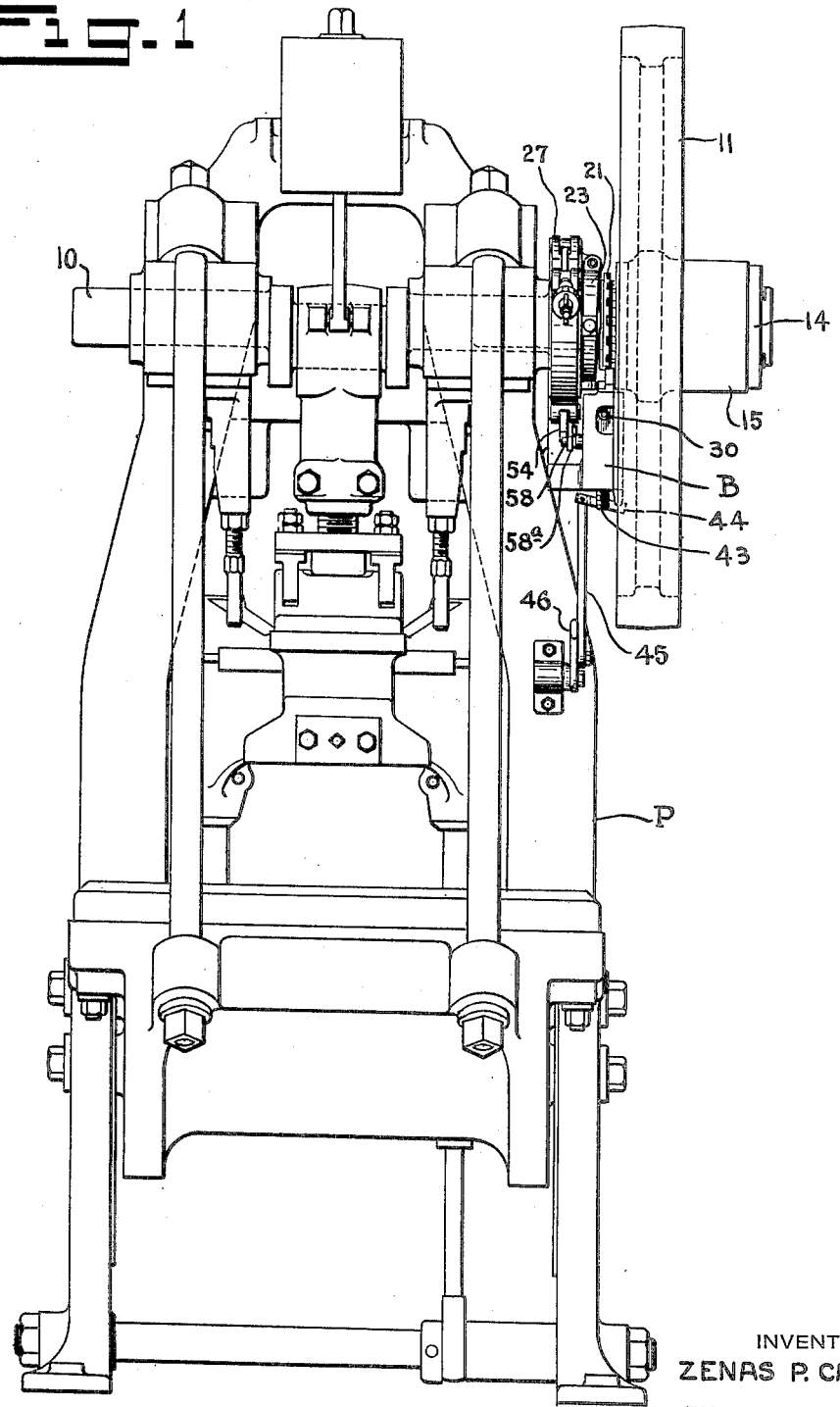
Fig. 1 represents a front elevation of a power press upon which the improved positive jaw clutch has been installed.

The main feature of the present invention is the mechanism for resiliently holding the driving jaw resiliently attached to the fly wheel, comprising a series of stiff spring dowel pins, which are driven tightly into the fly wheel for part of their length, said fly wheel having clearance holes to permit the other ends of said pins to absorb the shocks from the clutch when the jaws come into engagement.

The driving jaw thus has a slight lateral or axial floating action, so that even if there is some slight inaccuracy of the machining of the jaws, the clutch will be self-centering when the jaws are pressed together.

Referring now to the drawings in which like reference numerals denote corresponding parts throughout the several views, the numeral 10 indicates a continuously-driven shaft of a punch press P having a belt-driven fly wheel 11 at one end thereof, said shaft 10 having an enlarged section 10a.

As clearly shown in Fig. 2, the fly wheel 11 is provided with a hub 15 mounted on anti-friction bearings 12 which are held in operating position by means of an end cap 13, and provided with a cover plate 14.

Located within the hub 15 are a plurality of stepped spring plugs or dowel pins 16 (four in this instance), which are driven tightly into cylindrical holes 17, passing through said hub, and which pins have reduced resilient sections 18 to provide a clearance at the inner ends of the holes 17.

The dowel pins 16 are also provided with reduced rounded ends 19, which are adapted to fit tightly within corresponding cylindrical apertures 19a in a floating ring-shaped driving jaw 20 of the clutch, which jaw 20 is adapted to be engaged by a similarly-shaped sliding driven jaw 21 whenever the press is in operation. The sliding driven jaw 21 is held non-rotatively on the enlarged section 10a of the shaft 10 by four keys 22 (see Fig. 3).

The sliding driven jaw 21 is normally pressed toward the driving jaw 20 by means of a plurality of horizontal coil springs 21a.

Provision is also made of a rotative ring-shaped yoke 23 pivoted at one end upon a pin 24 carried by an internal brake drum 26 secured to the enlarged section 10a of the shaft 10 and embraced by a brake band 27—said yoke having a round-edged roller 25 diametrically opposite the pivot pin 24 and being engageable by a vertical trip slide 28 for operating the clutch.

The trip slide 28 is normally held in its lowermost position by means of a horizontal catch plunger 29 mounted in a cross hole 34 in said slide. The plunger 29 has a vertical hole 29a therein, for a purpose to be described later, and also has a reduced outer end 30 embraced by a coiled spring 31 which engages a washer 32 held in place on said catch plunger 29 by a cotter pin 33.

The trip slide 28 is also provided with a vertical bore 35 intersecting the horizontal cross hole 34, and within which is a vertical trip bolt 36 having a reduced intermediate section 37 and a cylindrical top head 38 which is located in the upper part of the vertical bore 35.

Provision is also made of a vertical coiled spring 39 embracing the lower end of the trip bolt 36 and pressing upwardly against a collar 39a of said bolt 36 located below the reduced section 37 thereof.

In order to operate the clutch, provision is made of a short lever link 44 connected to the lower end of the trip bolt 36 by means of a pin 45a, said link 44 being attached at its outer end to a depending rod 45, which is connected to a hand lever 46 mounted on the body of the press P.

The brake band 27 is adapted to be adjusted by means of a screw 51 and held in adjustment by means of a pair of nuts 52, 53 (see Fig. 3).

The driving jaw 20 is held loosely against a shoulder 59 on the shaft 10 at the end of the enlarged section 10a thereof (see Fig. 2).

*Continuous operation*

With the press set for continuous operation, when the operator presses down on the hand lever 46, the rod 45 will be depressed, pulling down the central trip bolt 36 which rests on the ledge on the top of the cross catch plunger 29, and consequently the trip slide 28 will also be pulled down.

At the same time that the trip slide 28 moves upwardly, the brake band 27 will be tightened about the brake drum 26 by the toggle action of the link 58a and the lever 54, the friction thus produced normally being sufficient to stop the machine.

One advantage of this invention resides in the novel construction of the driving jaw mechanism whereby minor inaccuracies in machining of the clutch jaws or other parts will be rendered harmless during operation of the press.

Another advantage is that the novel resilient coupling improves the accuracy of the feed by avoiding the high degree of shock which would otherwise occur when the clutch jaws are engaged.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a power press, a horizontal continuously driven shaft, a flywheel having a hub embracing said shaft, a pair of anti-friction bearings and a spacer sleeve mounted between said shaft and the interior of said hub, a flexible coupling for yieldably joining said flywheel to the driven clutch jaw of a power press, said coupling comprising a plurality of elongated solid stepped spring dowel pins parallel to said shaft and having their large ends fitted for their entire lengths in a like number of longitudinal cylindrical bores of uniform diameter located in said hub, equidistantly spaced around the axis of said flywheel and held by friction from rotation and sliding with respect thereto, the other end portions of said dowel pins being reduced in diameter to provide clearance from said bores and having rounded end knobs, and a ring-shaped clutch-driving plate located adjacent said hub and coaxial therewith, said plate having a plurality of openings embracing the greatest circumference of said rounded knobs, whereby said dowel pins will be laterally flexible in said plate, permitting it to have a self-centering floating action with respect to said hub.

ZENAS P. CANDEE.

References Cited in the file of this patent

UNITED STATES PATENTS

| Number | Name | Date |
| --- | --- | --- |
| 1,687,035 | Newhouse | Oct. 9, 1928 |
| 2,187,955 | Sonnenberg | Jan. 23, 1940 |
| 2,559,709 | Candee | July 10, 1951 |

FOREIGN PATENTS

| Number | Country | Date |
| --- | --- | --- |
| 175,387 | Germany | 1906 |
| 301,065 | Germany | 1917 |
| 391,004 | Great Britain | 1933 |